United States Patent [19]
Mionet et al.

[11] 3,795,869
[45] Mar. 5, 1974

[54] FREQUENCY SOURCE INCLUDING FAULT RESPONSIVE CONTROL

[75] Inventors: Hubert Mionet, Antony; Francois Bronner, Fontenay-le-Fleury; Pierre Fruteau, Paris, all of France

[73] Assignee: Compagnie Industrielle Des Telecommunications Cit-Alcated, Paris, France

[22] Filed: Feb. 14, 1972

[21] Appl. No.: 225,897

[30] Foreign Application Priority Data

Feb. 12, 1971 France .............................. 7104712

[52] U.S. Cl. .................. 330/2, 330/124 R, 330/51, 307/204, 307/215

[51] Int. Cl. ........................................... H03f 19/00

[58] Field of Search ........... 307/215, 216, 204, 219; 330/124 R, 124 D; 333/3

[56] References Cited

UNITED STATES PATENTS

| | | | |
|---|---|---|---|
| 3,348,163 | 10/1967 | Hirst | 330/124 D X |
| 3,223,940 | 12/1965 | Early et al. | 330/124 D X |
| 3,283,169 | 11/1966 | Libaw | 307/204 |
| 3,543,048 | 11/1970 | Klaschka | 307/204 |

*Primary Examiner*—Nathan Kaufman
*Attorney, Agent, or Firm*—Craig and Antonelli

[57] ABSTRACT

A frequency source including an input circuit connected to receive an input pulse stream and arranged to direct alternate pulses into respective first and second amplifier systems whose outputs are combined in a summation element, and first and second logic circuits connected to receive the outputs of the respective amplifier systems and control signals from the input circuit and arranged to respond to a fault in the respective amplifier system by causing all the input pulses to pass to the other system.

12 Claims, 4 Drawing Figures

FREQUENCY SOURCE INCLUDING FAULT RESPONSIVE CONTROL

Figure 1:
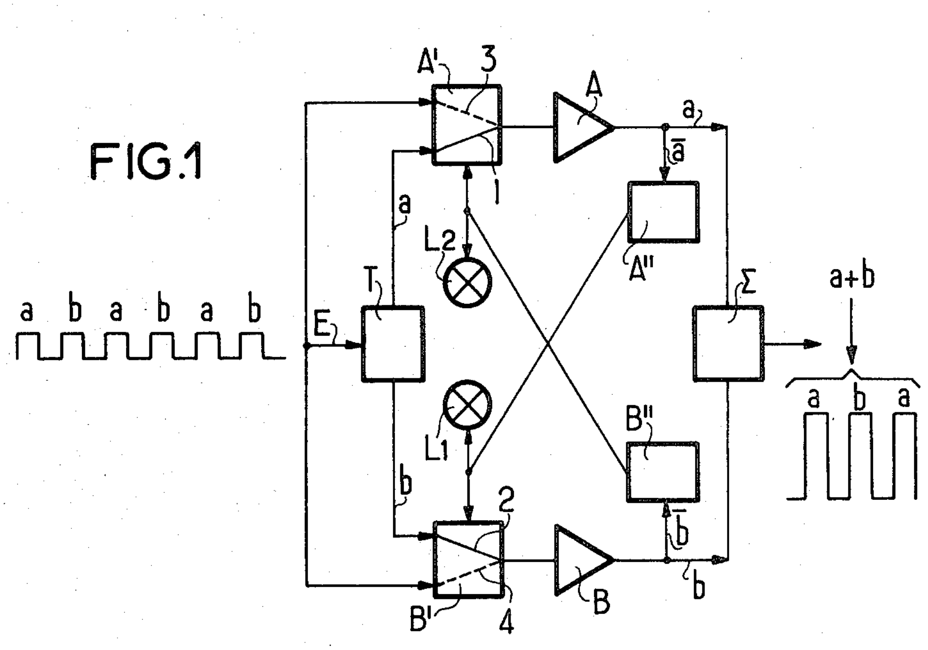

The present invention concerns frequency sources, particularly, but not exclusively, suitable for supplying high frequency signal currents in telecommunications systems.

In the terminal station of a carrier current telecommunication system there is provided a frequency generator from which at least the majority of the carrier frequencies are derived by appropriate operations on the basic frequency supplied. The distribution of this basic frequency must be carried out with virtually absolute dependability. Amplifier-distributor systems of correspondingly high dependability are therefore required.

It has been found that the degree of dependability provided by a signal amplifier-distributor system, however carefully designed and constructed, does not reach the required value. The use of two amplifier systems, one being substituted for the other in the event of failure, however, can provide the necessary degree of dependability.

A first proposal consists in an apparatus known as a permutator which monitors two amplifier systems operating simultaneously. The one ie effectively in service while the other is effectively in reserve. The substitution for a failed amplifier system of the reserve system is carried out rapidly by the change-over of an electromechanical relay. The switching time of an electromechanical relay can attain some few milliseconds, however, which is a disadvantage in that the frequency supply is interrupted during this period in the event of a failure. This cannot be tolerated in most modern equipment.

Electronic permutators have been proposed which do not involve this difficulty. In one proposal the two amplifier systems operate in parallel. If one fails the other ensures continuity of the supply. There is no interruption of service, but the output amplitude of the system changes. This disadvantage, which is also unacceptable in modern equipment, can be avoided by the use of voltage limiting, but it is then necessary to increase the output level of the amplifier systems, which is an unsatisfactory and costly solution to the problem.

In another proposal there are generated two equal voltages with a phase difference of 120°. The resultant therefore has the same amplitude as each component voltage with a phase relation of 60°. In case of failure of one system, one of the voltage components is maintained. Service is continued with the same amplitude, but the resulting phase rotation is undesirable in modern techniques.

In accordance with the present invention there is provided a frequency source comprising an input circuit connected to receive an input pulse stream and arranged to direct alternate pulses into respective first and second amplifier systems whose outputs are combined in a summation element, and first and second logic circuits connected to receive the outputs of the respective amplifier systems and control signals from the input circuit and arranged to respond to a fault in the respective amplifier system by causing all the input pulses to pass to the other system.

Figure 2B:
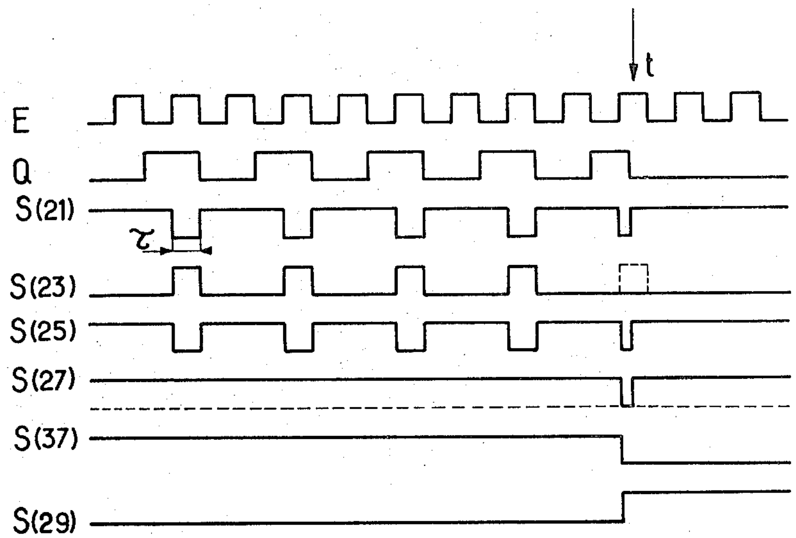
Figure 2A:
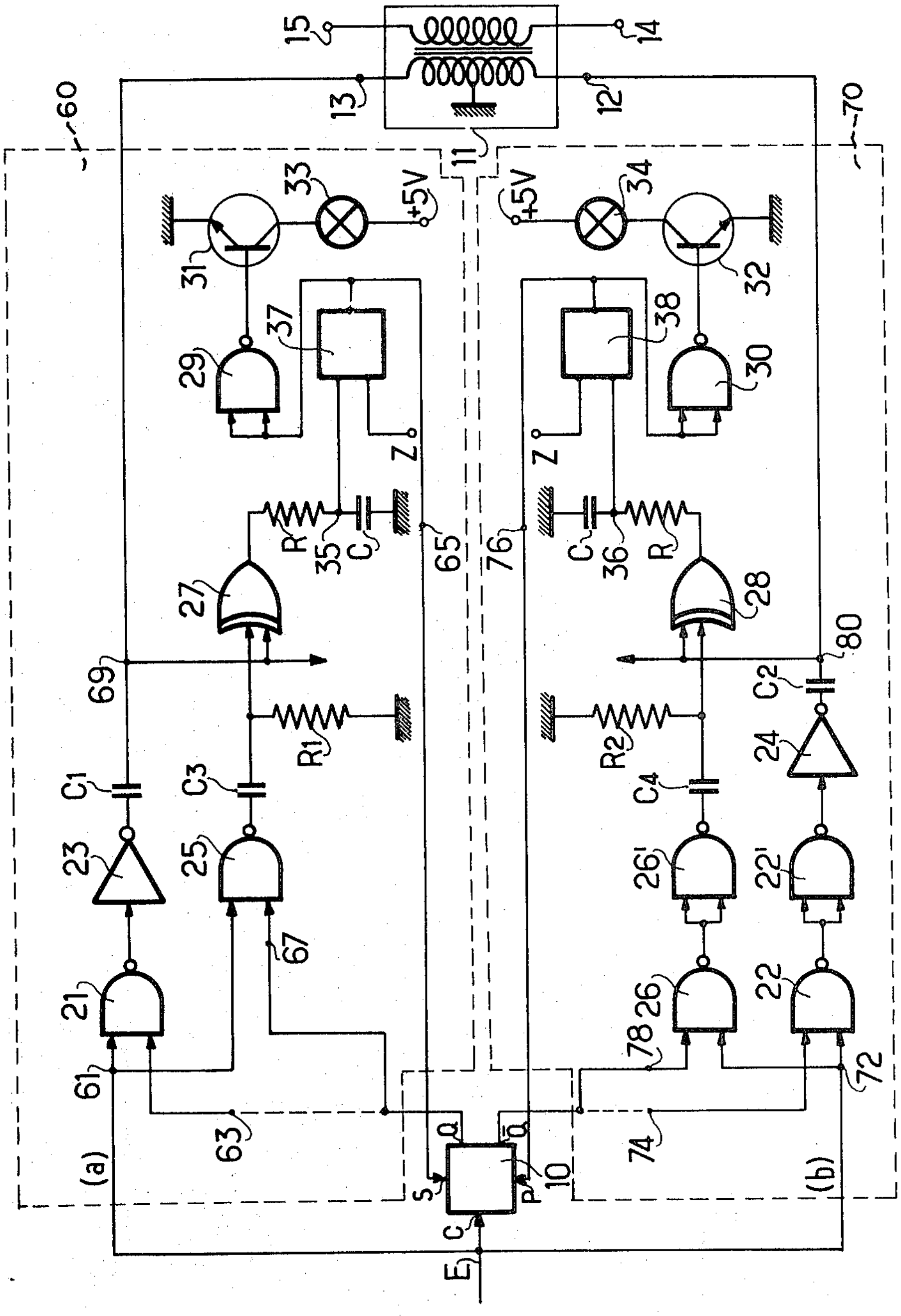
Figure 3:
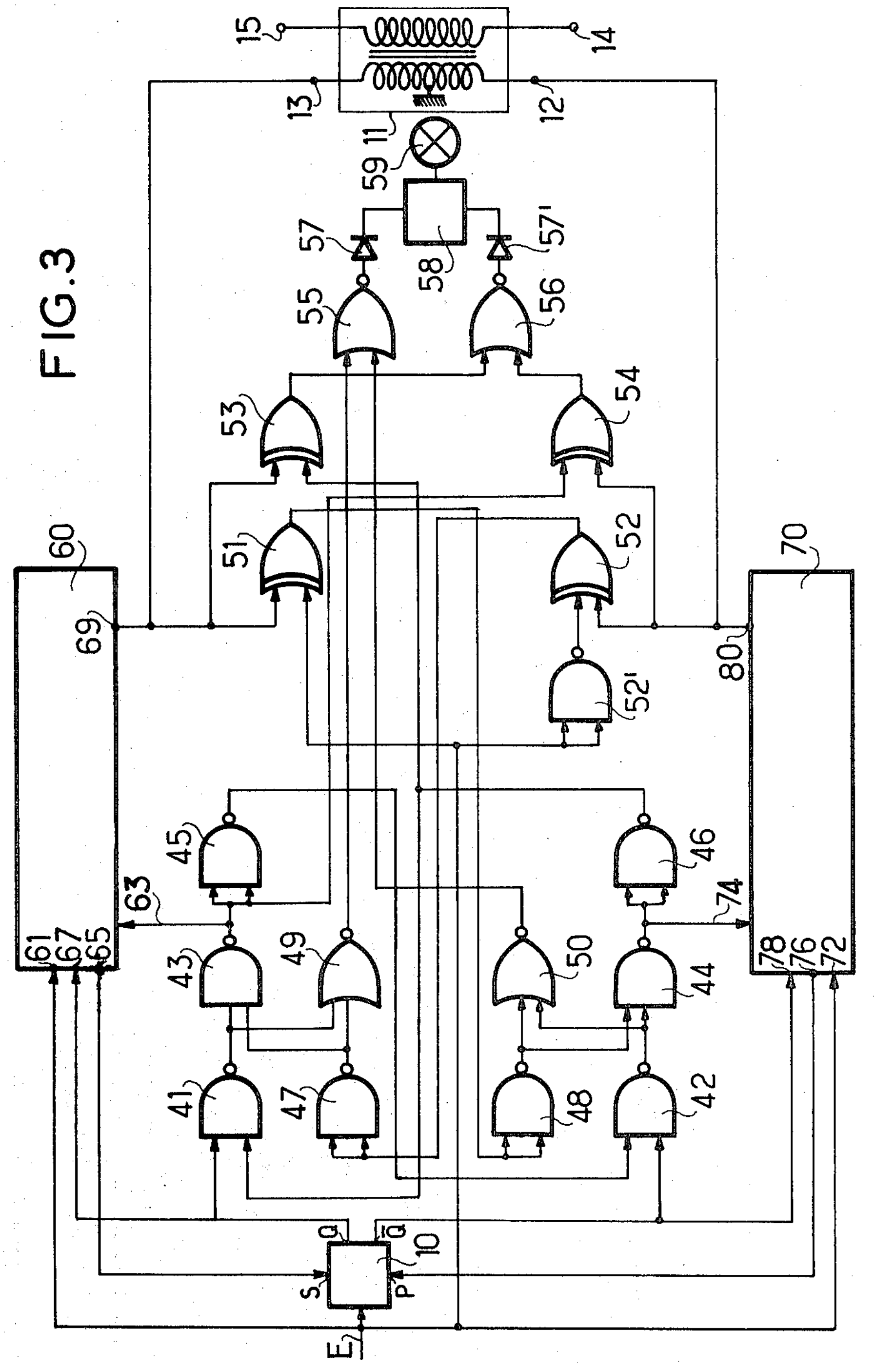

The invention will now be described in more detail, by way of example only, and with reference to the accompanying diagrammatic drawings in which:

FIG. 1 is a basic block diagram of the frequency source;

FIG. 2*a* is a simplified logic diagram of the basic elements of the source;

FIG. 2*b* is a waveform diagram referred to in the description of the operation of the source; and FIG. 3 is a schematic diagram of the complete source.

Referring to FIG. 1, an input pulse stream is applied to an input E of an input circuit T. The input pulses are labeled alternately *a* and *b* and the input circuit T directs the alternate pulses to respective amplifier systems A and B.

The pulses *a* are applied to amplifier system A through a two-position switch A′ shown in position 1. Its other position is indicated by the dashed line 3.

The pulses *b* are applied to amplifier system B through a two-position switch B′ shown in position 2 with its other position 4 shown in dashed line.

In switch positions 1 and 2 the inputs of amplifier systems A and B receive pulses *a* and *b* respectively. In switch positions 3 and 4 the amplifier systems receive all the input pulses.

The amplified pulses *a* and *b* are applied to respective inputs of a summation element Σ at whose output is obtained a pulse stream consisting of the input pulse stream appropriately amplified.

The output of amplifier system A is connected to a first logic circuit A″ which responds to the logic signal $\bar{a}$, that is the absence of a pulse *a* at the output of amplifier system A, by switching the two-position switch B′ to position 4. All the input pulses are thereafter applied to amplifier system B, which alone provides the amplified output pulse stream. Having changed its state in response to the logic signal $\bar{a}$, the logic circuit A″ remains in its new state until manually reset. As well as actuating the two-position switch B′, the logic circuit A″ illuminates a signal lamp L1 to indicate that amplifier system A has failed.

In a precisely analogous manner, the output of the amplifier system B is connected to a logic circuit B″ controlling operation of the two-position switch A′ and a signal lamp L2.

All switching in the system just described is carried out electronically. In normal operation both amplifier systems operate continuously, each providing amplification of one pulse in two. Should one system fail the entire input pulse stream is amplified by the other system after a switching period of some 10 nanoseconds.

Referring to FIG. 2*a*, the system just described in outline comprises as the input circuit a bistable flip-flop 10. The clock input C of the flip-flop 10 are connected to the input E. The Q and $\bar{Q}$ outputs of the flip-flop 10 are connected to respective inputs of NAND gates 21 and 22, whose outputs are connected to the inputs of respective amplifiers 23 and 24, the output of gate 22 being connected to the input of amplifier 24 through an inverter 22′. The Q and $\bar{Q}$ outputs of flip-flop 10 are also connected to first inputs of respective NAND gates 25 and 26. The second inputs of gates 21, 22, 25 and 26 are connected directly to the input terminal E.

The outputs of amplifiers 23 and 24 are connected through respective capacitances C1 and C2 to respective ends 12 and 13 of the primary winding of a differential transformer 11. The secondary winding of transformer 11 is connected between terminals 14 and 15. The amplifier outputs are also connected through the capacitances C1 and C2 to first inputs of respective EXCLUSIVE-OR gates 27 and 28 whose second inputs are connected to the output of gate 25 through capacitance C3 and the output of inverter 26' through capacitance C4, respectively. These second inputs of the EXCLUSIVE-OR gates 27 and 28 are also connected through respective resistances R1 and R2 to a point held at ground or effective ground potential. The resistance-capacitance combinations R1–C3 and R2–C4 form respective differentiator circuits connected between the output of gate 25 and gate 27 and the output of inverter 26' and gate 28.

The outputs of gates 27 and 28 are connected to the point at ground or effective ground potential through series-connected resistance-capacitance combinations R–C. The junction 35 and 36 of the R–C combinations are connected to the inputs of respective bistable flip-flops 37 and 38 with reset inputs Z. The outputs of flip-flops 37 and 38 are connected to set inputs S and P respectively of the input flip-flop 10. These outputs are also connected through respective inverters 29 and 30 to the bases of respective NPN transistors 31 and 32 whose emitters are connected to the point at ground or effective ground potential, and whose collectors are connected through respective signal lamps 33 and 34 to the positive supply voltage.

Various points in the figure have been labeled for convenience of reference in the following description. The inputs of gates 21 and 25 connected to input terminal E are reference 61, while that of gate 21 connected to output terminal Q of flip-flop 10 is reference 63 and that of gate 25 connected to output terminal Q is referenced 67. The input of gate 27 connected to the output of amplifier 23 is referenced 69. The inputs of gates 22 and 26 connected to input terminal E are referenced 72, while those of gates 22 and 26 connected to terminal $\bar{Q}$ of flip-flop 10 are referenced 74 and 78 respectively. The input of gate 28 connected to the output of amplifier 24 is referenced 80.

The differential amplifier 11 is used as a summation element for the pulses amplified by amplifiers 23 and 24 respectively. Since a differential transformer provides at its output the difference of the signals applied to its inputs, inverters 22' and 26' are included in the system of amplifier 24.

All the circuitry so far described preferably is in the form of integrated circuits.

The frequency source just described operates as follows:

FIG. 2*b* shows the input pulse stream E, the waveform at the output Q of flip-flop 10, the output waveforms of gates 21, 25 and 27, the output waveform of amplifier 23, and the output waveform of flip-flop 37. Until the moment indicated by the vertical arrow *t*, the source operates without failure. There is a logic value "1" permanently at the output of gate 27 and also at the output of flip-flop 37. The pulses obtained at the outputs of gates 21 and 25 and at the output of amplifier 23 have a width $\tau$ determined by the resistance-capacitance network R–C. This eliminates the effect of the propagation time dispersion of the integrated circuits.

At time *t* the system of amplifier 23 fails, the pulse indicated in dashed outline being suppressed. The output of gate 27 therefore passes to logic "zero" which via flip-flop 37 sets flip-flop 10 with logic "zero" permanently on its output Q. Logic "1" is applied permanently to inputs 74 and 78 of gates 22 and 26, so that amplifier 24 receives all input pulses.

The logic "zero" at the output of flip-flop 37 provides logic "1" at the output of inverter 29 which causes transistor 31 to conduct and illuminate signal lamp 33. This provides an indication that the system of amplifier 23 has failed.

It will be appreciated that the source reacts in a precisely analogous manner to the failure of the system of amplifier 24, responding to the lack of an expected pulse *b* at the output of amplifier 24.

The circuit of FIG. 2*a* can be regarded as two sub-assemblies connected between the input flip-flop 10 and the output differential transformer 11. Each sub-assembly includes the respective amplifier 23 or 24 with the logic circuitry for monitoring its performance.

FIG. 3 shows the complete frequency source including first circuitry for monitoring operation of the circuit monitoring operation of the amplifiers. In FIG. 3, the two sub-assemblies of FIG. 2*a* are indicated 60 and 70 respectively. Sub-assembly 60 has inputs 61, 63 and 67 and outputs 65 and 69, these being the points so referenced in FIG. 2*a*. Similarly, sub-assembly 70 has inputs 72, 74 and 78 and outputs 76 and 80.

Referring to FIG. 3, NAND gates 41 and 42 have first inputs connected to the Q and Q outputs of flip-flop 10 respectively. Their outputs are connected to first inputs of respective NAND gates 43 and 44 and NOR gates 49 and 50. The outputs of gates 43 and 44 are connected to inputs 63 and 74 respectively of sub-assemblies 60 and 70 and to the inputs of respective inverters 45 and 46. The output of gate 43 is also connected to one input of an EXCLUSIVE-OR gate 54.

The output of inverter 45 is connected to the second input of gate 42 and that of inverter 46 to the second input of gate 41, as well as to one input of an EXCLUSIVE-OR gate 53.

The input terminal E of flip-flop 10 is connected to one input of an EXCLUSIVE-OR gate 51 and through an inverter 52' to one input of an EXCLUSIVE-OR gate 52. Second inputs of gates 51 and 52 are connected to outputs 69 and 80 respectively of sub-assemblies 60 and 70. The output of gate 51 is connected through an inverter 48 to the second input of gate 50 and also to the second input of gate 44. The output of gate 52 is connected through an inverter 47 to the second inputs of gates 43 and 49.

The outputs of gates 49 and 50 are connected to respective inputs of a NOR gate 55. The second inputs of gates 53 and 54 are connected to outputs 69 and 80 respectively of sub-assemblies 60 and 70, and the outputs of gates 53 and 54 to respective inputs of a NOR gate 56. The outputs of gates 55 and 56 are connected to the anodes of respective diodes 57 and 57' whose cathodes are connected to respective inputs of a comparator 58. The output of comparator 58 is connected to a lamp 59.

The remaining connections of FIG. 3 are those of FIG. 2*a* and need not be described in detail.

The lamp 59 is illuminated by comparator 58 when the two input voltages to the latter are not equal.

The 15 possible failure states of the frequency source will now be described.

1. If the output of gate 41 remains at logic "zero," the entire output signal is provided by amplifier 23. Amplifier 24 is cut off by gates 45, 51, and 48. The failure is indicated by gates 49 and 55 to illuminate lamp 59. If, on the other hand, the output of gate 51 remains permanently at logic "1", amplifier 23 functions as normal, gate 43 is controlled through gates 47 and 52 and inverter 52', and the failure is indicated by gates 49 and 55 illuminating lamp 59.

2. If the output of gate 47 remains permanantly at logic "zero," amplifier 23 provides the whole output signal. The failure is indicated as just described in paragraph 1. If the output of this gate rests permanently at logic "1", amplifier 23 provides the whole output signal, gate 43 is controlled by gate 41 and the failure is once again indicated by gates 49 and 55 controlling lamp 59.

3. If the output of gate 43 remains permanently at logic "zero," amplifier 23 is blocked. The failure is detected by gate 51 which controls gates 48 and 44 so that amplifier 24 provides the whole output signal. The failure is indicated by gates 52, 47, 49 and 55 controlling lamp 59. If the output of this gate rests permanently at logic "1", amplifier 23 provides the entire output signal and amplifier 24 is blocked by gates 45, 42, 51, 48 and 44. The failure is indicated by gates 54 and 56 controlling lamp 59.

4. If the output of gate 49 remains permanently at logic "zero," the operation of amplifiers 23 and 24 is unaffected. The failure is indicated by gate 55 operating lamp 59. The system responds in precisely the same way to the output of this gate remaining permanently at logic "1".

5. If the output of gate 51 remains permanently at logic "zero," the operation of amplifiers 34 and 24 is unaffected. The failure is indicated by gates 50 and 55 operating lamp 59. If the output remains permanently at logic "1," however, amplifier 24 provides the entire output signal and amplifier 23 is cut off by gates 46, 41, 52, 47 and 43. The failure is signaled by gates 50 and 55 operating lamp 59.

6. If the output of gate 53 remains permanently at logic "zero," or at logic "1," there is no effect on the operation of amplifiers 23 and 24 and the failure is indicated by gate 56 operating lamp 59.

7. If the output of gate 55 remains permanently at logic "zero," or logic "1," there is no effect on the operation of amplifiers 23 and 24 and the failure is indicated by lamp 59 directly.

8. If the output of gate 48 remains permanently at logic "zero," amplifier 24 provides the entire output signal. Amplifier 23 is cut off by gates 46, 41, 52, 47 and 43, and the failure is indicated by gates 50 and 55 operating lamp 59. If the output of this gate remains permanently at logic "1," amplifier 24 operates as normal, gate 44 being controlled by gate 42. The failure is indicated by gates 50 and 55 operating lamp 59.

9. If the output of gate 42 remains permanently at logic "zero," amplifier 24 provides the entire output signal. Amplifier 23 is cut off by gates 46, 41, 52, 47 and 43, and the failure is indicated by gates 50 and 55 operating lamp 59.

10. If the output of gate 50 remains permanently at logic "zero," or logic "1," the operation of amplifiers 23 and 24 is not affected. The failure is indicated by gate 55 illuminating lamp 59.

11. If the output of gate 44 remains permanently at logic "zero," amplifier 24 is cut off. The failure is detected by gates 52 and 47 which control gate 43 so that amplifier 23 provides the entire output signal. The failure is indicated by gates 52, 47, 50 and 55 illuminating lamp 59. If the output of this gate remains permanently at logic "1," amplifier 24 provides the entire output signal and amplifier 23 is cut off by gates 46, 41, 52, 47 and 43. The failure is indicated by gates 53 and 56 illuminating lamp 59.

12. If the output of gate 46 remains permanently at logic "zero," the operation of amplifiers 23 and 24 is unaffected. The effects of this failure on the control of amplifier 23 are overridden by gates 52, 47 and 43. The failure is indicated by gates 53 and 56 illuminating lamp 59. The system responds in the same way to the output of this gate remaining permanently at logic "1."

13. If the output of gate 52 remains permanently at logic "zero," or logic "1," there is no effect on the operation of amplifiers 23 and 24. The failure is indicated by gates 52, 47, 49 and 55 illuminating lamp 59.

14. If the output of gate 52 remains permanently at logic "zero" there is no effect on the operation of amplifiers 23 and 24. The failure is indicated by gates 47, 49 and 55 illuminating lamp 59. If, however, the output of this gate remains permanently at logic "1," amplifier 23 provides the entire output signal. Amplifier 24 is cut off by gates 45, 42, 51, 48 and 44. The failure is indicated by gates 47, 49 and 55 illuminating lamp 59.

15. If the output of gate 54 remains permanently at logic "zero" and that of gate 56 remains permanently at logic "1," there is no effect on the operation of amplifiers 23 and 24 and the failure is indicated by lamp 59.

In each of these eventualities the continuity of supply of the amplified pulses is assured and each failure is indicated. The entire operation of the frequency source is rigorously monitored and the reliability of the source approaches 100 per cent.

The frequency source just described assures the continuity of supply with minimal interruption, with no variation in output level or phase, and provides an instantaneous indication of any failure.

What is claimed is:

1. A frequency source comprising an input circuit connected to receive an input pulse stream including means for directing alternate pulses to respective first and second outputs, first and second amplifier systems connected respectively to said first and second outputs, summation means for combining the outputs of said first and second amplifier systems, and first and second logic circuit means connected respectively to the outputs of said first and second amplifier systems for controlling said input circuit to direct all of said pulse stream to one amplifier system in response to failure in the other amplifier system.

2. A frequency source as defined in claim 1 wherein said directing means of said input circuit is a bistable circuit receiving said input pulse stream on one input and providing pulses alternately on first and second outputs thereof, said bistable circuit including a first control input means responsive to said first logic circuit means for switching all of said input pulses to said second output of said bistable circuit and second control input means responsive to said second logic circuit means for switching all of said input pulses to said first output of said bistable circuit.

3. A frequency source as defined in claim 2 wherein said first and second logic circuit means each include an EXCLUSIVE-OR gate connected to receive said input pulse stream and the output of said first and second amplifier systems, respectively, and control means for connecting the outputs of said EXCLUSIVE-OR gates to said first and second control input means of said bistable circuit, respectively.

4. A frequency source as defined in claim 3 wherein said control means includes a first flip-flop circuit connected between the output of one EXCLUSIVE-OR gate and said first control input means of said bistable circuit and a second flip-flop circuit connected between the output of the other EXCLUSIVE-OR gate and said second control input means of said bistable circuit.

5. A frequency source as defined in claim 4 wherein said control means further includes first and second indicating means connected respectively to the output of said first and second flip-flop circuits to indicate actuation thereof.

6. A frequency source as defined in claim 5 wherein said summation means is a differential transformer.

7. A frequency source as defined in claim 5 further including a first NAND gate having inputs connected to receive said input pulse stream and said first output of said bistable circuit and an output connected to the input of said first amplifier system, and a second NAND gate having inputs connected to receive said input pulse stream and said second output of said bistable circuit and an inverter connected between the output of said second NAND gate and the input of said second amplifier system.

8. A frequency source as defined in claim 7 wherein said first logic circuit means further includes a third NAND gate having inputs connected to receive said input pulse stream and said first output of said bistable circuit and a first differentiator circuit connecting the output of said third NAND gate to one input of said one EXCLUSIVE-OR gate, another input of said one EXCLUSIVE-OR gate being connected to the output of said first amplifier system through a first capacitor.

9. A frequency source as defined in claim 8 wherein said second logic circuit means further includes a fourth NAND gate having inputs connected to receive said input pulse stream and said first output of said bistable circuit, a second inverter connected to the output of said fourth NAND gate and a second differentiator circuit connecting the output of said fourth NAND gate to one input of said other EXCLUSIVE-OR gate, another input of said EXCLUSIVE-OR gate being connected to the output of said second amplifier system through a second capacitor.

10. A frequency source as defined in claim 9, further including first comparator means for comparing the input signals of said first and second amplifier systems with the outputs thereof and second comparator means for comparing the sum of the input signals of said first and second amplifier systems to the output of said first comparator means.

11. A frequency source as defined in claim 9 wherein said summation means is a differential transformer.

12. A frequency source as defined in claim 9, further including a fifth NAND gate having an input connected to the first output of said bistable circuit, a sixth NAND gate having an input connected to the output of said fifth NAND gate and an output connected to the input of said first NAND gate and to an input of a third inverter, a seventh NAND gate having one input connected to the second output of said bistable circuit, an eighth NAND gate having an input connected to the output of said seventh NAND gate and an output connected to an input of said second NAND gate and to a fourth inverter whose output is connected to another input of said fifth NAND gate, a fifth inverter connected to receive said input pulse stream, a third EXCLUSIVE-OR gate having one input connected to the output of said fifth inverter and a second input connected to the output of said second amplifier system, a sixth inverter connected between the output of said third EXCLUSIVE-OR gate and a second input of said sixth NAND gate, a first NOR gate having inputs connected to the outputs of said fifth NAND gate and said sixth inverter, a fourth EXCLUSIVE-OR gate having inputs connected to receive the input pulse stream and the output of said first amplifier system and an output connected to the input of a seventh inverter whose output is connected to another input of said eighth NAND gate, a second NOR gate having inputs connected to the outputs of said seventh inverter and said seventh NAND gate, a fifth EXCLUSIVE-OR gate having inputs connected to the output of said first amplifier system and the output of said fourth inverter and a sixth EXCLUSIVE-OR gate having inputs connected to the output of said second amplifier system and the output of said sixth NAND gate, a third NOR gate having inputs connected to the outputs of said fifth and sixth EXCLUSIVE-OR gates, a fourth NOR gate having inputs connected to the outputs of said first and second NOR gates, a comparator having a first input connected to the output of said fourth NOR gate and a second input connected to the output of said third NOR gate, and an indicator connected to the output of said comparator.

* * * * *